United States Patent
Katzir

(10) Patent No.: US 7,882,217 B2
(45) Date of Patent: Feb. 1, 2011

(54) NETWORK IDENTITY CLUSTERING

(75) Inventor: Ziv Katzir, Netanya (IL)

(73) Assignee: Verint Systems Inc., Melville, NY (US)

( * ) Notice: Subject to any disclaimer, the term of this patent is extended or adjusted under 35 U.S.C. 154(b) by 679 days.

(21) Appl. No.: 11/804,748

(22) Filed: May 17, 2007

(65) Prior Publication Data

US 2008/0285464 A1    Nov. 20, 2008

(51) Int. Cl.
*G06F 15/173* (2006.01)
(52) U.S. Cl. .................................................... 709/224
(58) Field of Classification Search ........................ None
See application file for complete search history.

(56) References Cited

U.S. PATENT DOCUMENTS

| 2005/0138201 A1 | 6/2005 | Soukup |
| 2006/0085370 A1* | 4/2006 | Groat et al. ..................... 707/1 |
| 2006/0265748 A1 | 11/2006 | Potok |

FOREIGN PATENT DOCUMENTS

WO    0215479 A    2/2002

OTHER PUBLICATIONS

VERINT Communications Interception Solutions Web Site: VANTAGE, as captured via archive.org as of Apr. 3, 2006, pp. 1-2.*
www.verint.com/communications_interception.
www.netoptics.com.

* cited by examiner

*Primary Examiner*—Ario Etienne
*Assistant Examiner*—Clayton R Williams
(74) *Attorney, Agent, or Firm*—Lawrence A. Aaronson, PC

(57) ABSTRACT

A computer-implemented method for communication analysis includes monitoring communication sessions, which are conducted by entities in a communication network. Identifiers that identify the entities are extracted from the monitored sessions. The identifiers extracted from the sessions are grouped in respective identity clusters, each identity cluster identifying a respective entity. A subset of the identity clusters, which includes identifiers that identify a target entity, is merged to form a merged identity cluster that identifies the target entity. An activity of the target entity in the communication network is tracked using the merged identity cluster.

27 Claims, 3 Drawing Sheets

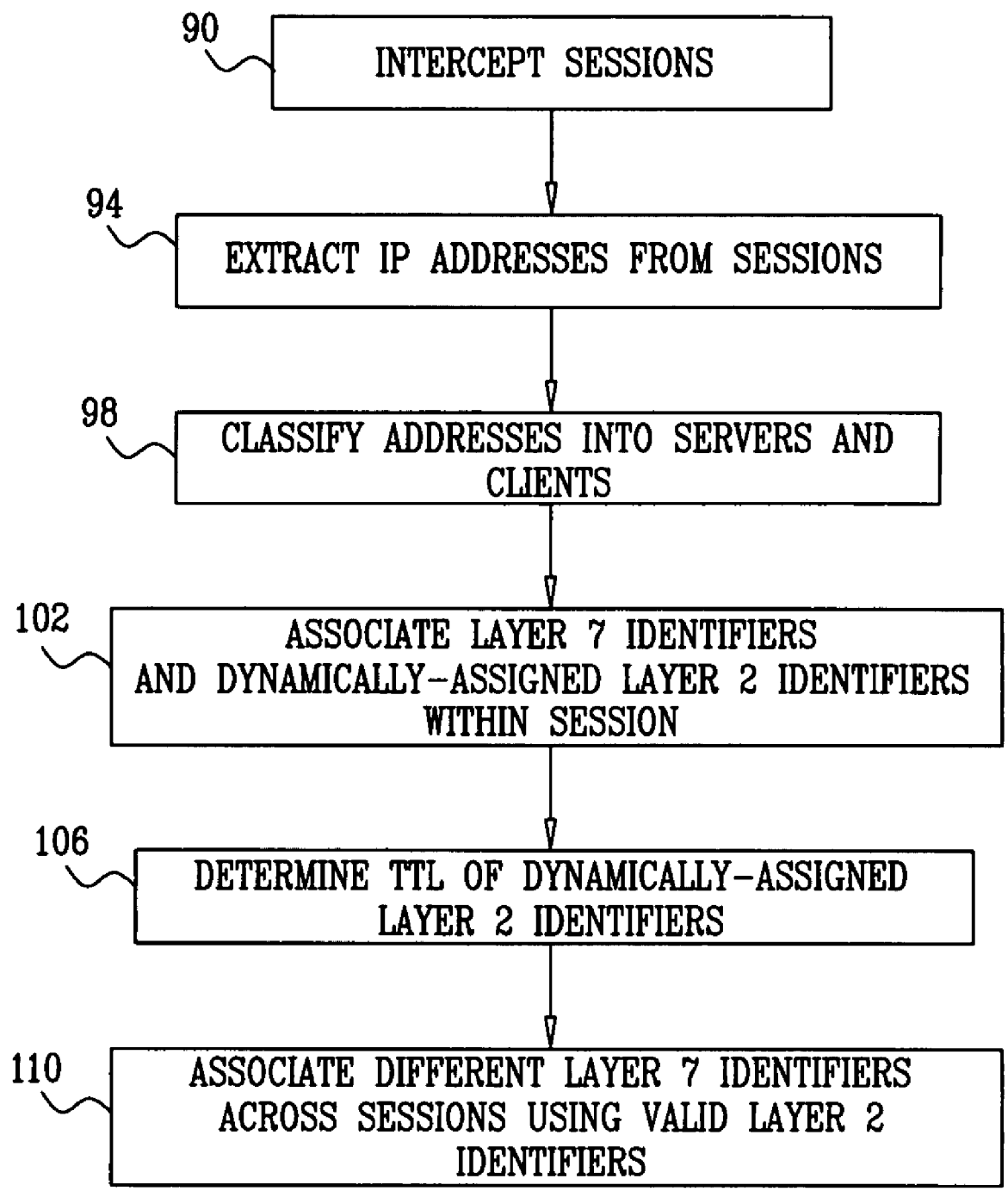

NETWORK IDENTITY CLUSTERING

FIELD OF THE INVENTION

The present invention relates generally to communication interception and analysis systems, and particularly to methods and systems for identifying and tracking users of communication systems.

BACKGROUND OF THE INVENTION

Several methods and systems for intercepting network communication and for analyzing information extracted from communication networks are known in the art. Such methods and systems are used by a variety of organizations, such as intelligence agencies, law enforcement agencies and communication service providers. For example, Verint® Systems Inc. (Melville, N.Y.) offers several systems and solutions for intercepting, filtering and analyzing wireline and wireless, cable and satellite, Internet, multimedia, and Voice over IP communication links. Details regarding these products can be found at www.verint.com/communications_interception.

SUMMARY OF THE INVENTION

Embodiments of the present invention provide a computer-implemented method for communication analysis, including:

monitoring communication sessions, which are conducted by entities in a communication network;

extracting from the monitored sessions identifiers that identify the entities;

grouping the identifiers extracted from the sessions in respective identity clusters, each identity cluster identifying a respective entity;

merging a subset of the identity clusters, which include identifiers that identify a target entity, to form an merged identity cluster that identifies the target entity; and tracking an activity of the target entity in the communication network using the merged identity cluster.

In some embodiments, the entities include individual users of the communication network.

In an embodiments, the identifiers include at least one identifier type selected from a group of types consisting of an Internet Protocol (IP) addresses, a Media Access Control (MAC) address, a Uniform Resource Identifier (URI), a path identifier in a tunneling protocol, a line identifier, a username, an e-mail addresses, a chat nickname, a nickname of an instant messaging application, a username of a peer-to-peer application, a username of a conferencing application, an International Mobile Subscriber Identity (IMSI), a Mobile Station Integrated Services Digital Network (MSISDN), an International Mobile Equipment Identity (IMEI), a Temporary Mobile Subscriber Identity (TMSI), a Voice over Internet Protocol (VoIP) identifier and a telephone number.

In another embodiment, merging the subset of the identity clusters includes iteratively searching the identity clusters in order to identify the identity clusters that identify the target entity, and progressively merging the identified identity clusters with one another.

In yet another embodiment, merging the subset of the identity clusters includes identifying in the identity clusters first and second identity clusters including a common identifier, and merging the first and second identity clusters. In some embodiments, the common identifier has a first validity period in the first identity cluster and a second validity period in the second identity cluster, and merging the first and second identity clusters includes merging the clusters responsively to verifying that the first validity period overlaps the second validity period.

In still another embodiment, the common identifier includes a short-lived identifier having a short validity period, the first identity cluster includes a first long-lived identifier, the second identity cluster includes a second long-lived identifier different from the first long-lived identifier, and verifying that the first validity period overlaps the second validity period includes associating the first and second long-lived identifiers with the target entity based on the common short-lived identifier.

In a disclosed embodiment, at least one of the communication sessions includes a composite session, which includes multiple sub-sessions having a shared identifier that is common to all the sub-sessions, and extracting and grouping the identifiers include identifying the sub-sessions of the composite session using the shared identifier, extracting the identifiers from the identified sub-sessions and grouping the identifiers extracted from the sub-sessions in a respective identity cluster.

In another embodiment, grouping the identifiers includes estimating likelihoods that the identifiers grouped in each identity cluster identify the respective entity, and assigning respective scores based on the likelihoods to the grouped identifiers in the identity cluster. Additionally or alternatively, merging the subset of the identity clusters includes estimating likelihoods that the merged identity clusters in the subset identify the target entity and assigning respective scores based on the likelihoods to the merged identity clusters.

In some embodiments, at least some of the sessions are conducted between service consumers and respective service providers, and extracting the identifiers includes identifying the service consumers and the service providers, assigning the identifiers that identify the service consumers a first confidence level and assigning the identifiers that identify the service providers a second confidence level lower than the first confidence level. Assigning the first and second confidence levels may include refraining from using the identifiers that identify the service providers.

In an embodiment, tracking the activity includes tracking a geographical location of the target entity. In another embodiment, merging the identity clusters includes constructing multiple identity clusters corresponding to respective entities, and tracking the activity includes determining and presenting one or more relationships between the entities.

In some embodiments, the communication network includes first and second communication networks of respective different first and second communication domains, monitoring the communication sessions includes monitoring a first communication session conducted by the target entity in the first communication network and a second communication session conducted by the target entity in the second communication network, and merging the subset of the identity clusters includes merging first and second identity clusters derived respectively from the first and second communication sessions into the merged identity cluster. In a disclosed embodiment, the first communication network includes a computer communication network and the second communication network includes a telephony network.

There is also provided, in accordance with an embodiment of the present invention, apparatus for communication analysis, including:

an interface, which is arranged to accept data of communication sessions conducted by entities in a communication network; and a processor, which is arranged to extract from the data identifiers that identify the entities, to group the identifiers in identity clusters, each identity cluster identifying a respective entity, to merge a subset of the identity clusters, which include identifiers that identify a target entity, to form an merged identity cluster that identifies the target entity, and to track an activity of the target entity in the communication network using the merged identity cluster.

There is additionally provided, in accordance with an embodiment of the present invention, a computer software product for communication analysis, the product including a computer-readable medium, in which program instructions are stored, which instructions, when read by a computer, cause the computer to accept data of communication sessions conducted by entities in a communication network, to extract from the data identifiers that identify the entities, to group the identifiers in identity clusters, each identity cluster identifying a respective entity, to merge a subset of the identity clusters, which include identifiers that identify a target entity, to form an merged identity cluster that identifies the target entity, and to track an activity of the target entity in the communication network using the merged identity cluster.

The present invention will be more fully understood from the following detailed description of the embodiments thereof, taken together with the drawings in which:

BRIEF DESCRIPTION OF THE DRAWINGS

FIGS. 3 and 4 are flow charts that schematically illustrate methods for communication analysis using identity clusters, in accordance with embodiments of the present invention.

DETAILED DESCRIPTION OF EMBODIMENTS

Overview

Figure 1:
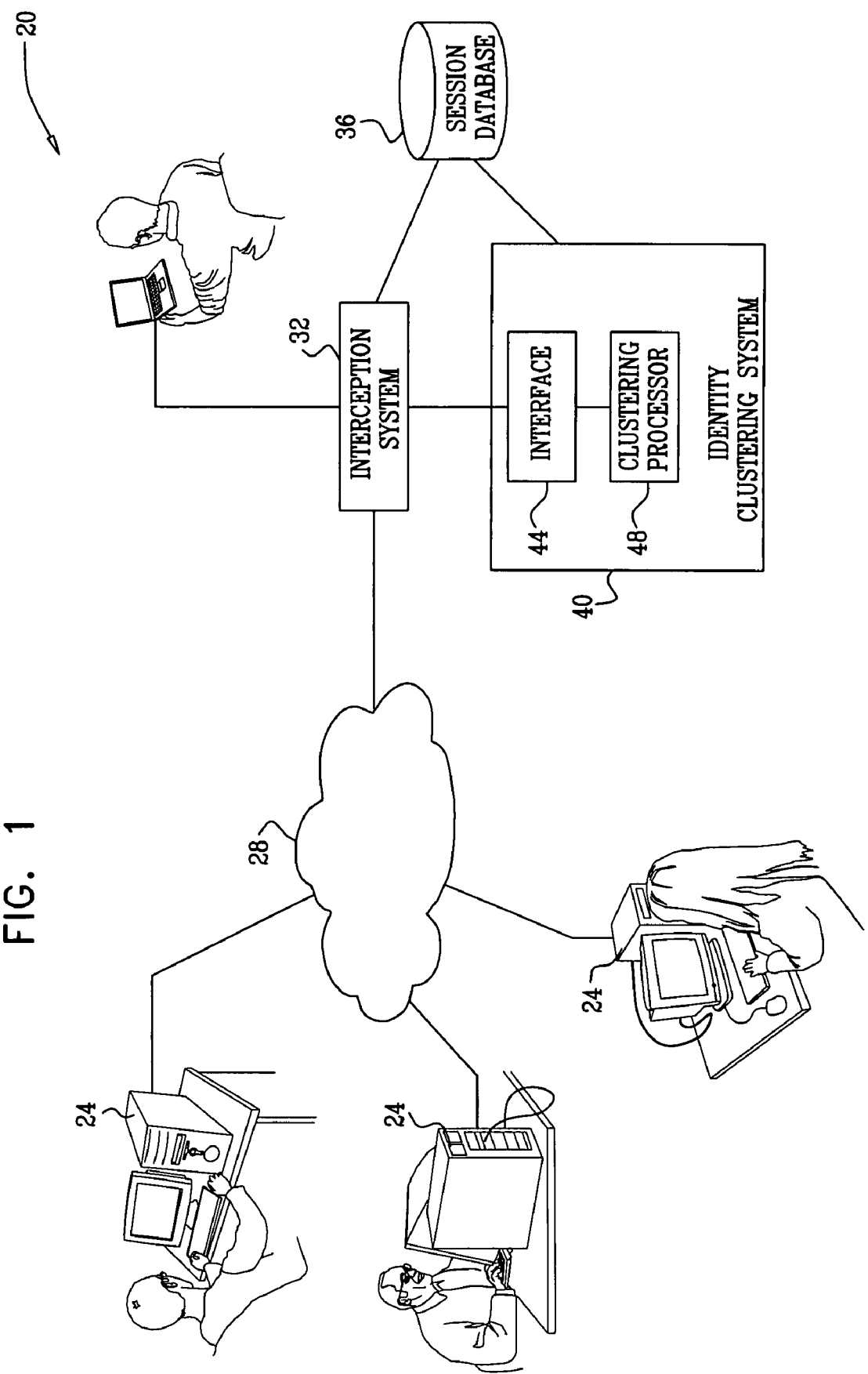
FIG. 1 is a block diagram that schematically illustrates a communication interception and analysis system, in accordance with an embodiment of the present invention.

Users of communication networks identify using different communication identifiers when they log into or otherwise join the network, use various applications and consume services. In a data network, such as over the Internet, a user can be identified using identifiers such as Internet Protocol (IP) addresses, login usernames, e-mail addresses, chat or instant messaging nicknames, usernames in peer-to-peer file sharing applications, as well as by telephone numbers used in network-based telephony sessions. In a telephony network, a user can be identified using identifiers such as telephone numbers, International Mobile Subscriber Identity (IMSI), International Mobile Equipment Identity (IMEI) and Temporary Mobile Subscriber Identity (TMSI) values and many others. Some of the identifiers may be used in both data networks and telephony networks.

In many intelligence and communication analysis applications it is highly advantageous to associate the different identifiers used by a particular user, to produce a unified identity of the user, and to take action upon the unified identity. Embodiments of the present invention that are described hereinbelow provide methods and systems for automatically associating ("clustering") the different identifiers used by a particular user, so as to produce a unified identity cluster that represents the user.

In some embodiments, an interception system monitors communication sessions, which are conducted by users or other entities in a communication network. An identity clustering system extracts the different identifiers that appear in the sessions. The system groups the communication identifiers used in each session, which are attributed to the same user, in a respective identity cluster. The clusters are typically stored in a database.

The identity clustering system carries out an iterative cluster merging process, in order to identify different clusters that represent the same user and merge them together. Typically, the system searches for clusters that contain at least one overlapping identifier and, when a match is found, merges the matching clusters. The iterative process attempts to achieve optimal merging, i.e., a situation in which each user is represented by a single identity cluster comprising the different identifiers used by the user. The matching and merging process can be carried out at any time with respect to session interception, either in real-time or off-line.

Various tracking-related actions can be carried out based on the information conveyed in the merged identity clusters. For example, the network activity (i.e., the communication sessions) and/or geographical location of a certain target user can be tracked. The system can also produce and present a relationship map showing relationships between different users. The methods and systems described herein thus enable communication analysis applications to obtain a unified view of target users and their communication activities.

Communication analysis applications are sometimes classified to target-centric and data-centric systems, and the methods and systems described herein can be used in both types of applications.

Data-centric applications, also sometimes referred to as mass interception applications, typically intercept and record large numbers of communication sessions without associating the intercepted data with specific users or entities ("targets"). In such applications, the identities of the targets are often unknown or undefined at the time the data is intercepted. The methods and systems described herein can be used in a data-centric mass interception system to produce a unified, target-centric analysis of communication sessions held by the user.

Target-centric applications attempt to collect data that is associated with target users, but usually provide no correlation or association between different communication identifiers that are used by a particular target, especially if such identifiers are used in different sessions or in different communication domains. The methods and systems described herein can be used in a target-centric application to provide such correlation and association.

In both data-centric and target-centric applications, identity clustering can be performed on the mass-intercepted data without having to define specific targets a-priori. The different clusters are then available on-demand.

Since at least some of the identifiers are not related to specific network types and domains, or to specific types of computers or communication terminals used by the users, the methods and systems described herein provide user-oriented characterization that is differentiated from the network types and physical computers or terminals used by the user. The terms "computer" and "terminal" are used herein in a broad sense to describe any and all types of communication endpoints used by users. Such terminals may be associated with computer communication networks, telephony networks and/ or any other suitable network type or domain.

Unlike manual identity tracking methods, the automatic methods described herein enable rapid and accurate identity clustering to be performed over a large collection of intercepted sessions.

In many cases, the content retention period of communication interception systems is limited by the cost and size of storage devices, which are used for storing intercepted sessions. The methods and systems described herein enable an interception and analysis system to store only identity clusters instead of entire sessions. As a result, the memory requirements can be reduced by several orders of magnitude, enabling cost and size reduction of the system and/or considerable extension of its content retention period.

System Description

FIG. 1 is a block diagram that schematically illustrates a communication interception and analysis system 20, in accordance with an embodiment of the present invention. System 20 tracks the activity of target entities, such as individual users 24, which communicate over a communication network 28.

Communication network 28 may comprise a computer or data network, such as a Wide Area Network (WAN), e.g., the Internet, a Metropolitan Area Network (MAN), a Local Area Network (LAN), an organizational intranet, a wireless data network such as a Wireless LAN (WLAN) or WiMAX™ network, a packet network such as an IP network or an Asynchronous Transfer Mode (ATM) network. Alternatively, communication network 28 may comprise a wireline or wireless telephone network such as a Public Switched Telephone Network (PSTN) or a cellular network. Network 28 may also comprise a combination of computer and/or telephony networks.

System 20 tracks the activity of the target entities by identifying and grouping various types of communication identifiers that are used by the entities when using network 28. These identification and grouping methods are described in detail hereinbelow. System 20 can be used, for example, by an analyst in an intelligence agency to detect, monitor and characterize the activity of a particular target individual, or to identify and characterize relationships between different target individuals based on their network activity.

In the description that follows, the tracked entities comprise individual users of network 28, although the methods and systems described herein can also be used to track other types of entities, such as groups of users or entire organizations. Users 24 of network 28 interact with one another, consume network services and otherwise communicate by conducting communication sessions, as will be described in detail below.

System 20 comprises an interception system 32, which is connected to network 28. System 32 collects data from communication sessions held in network 28, and provides this data to system 20. Various known interception systems can be used for this purpose. For example, Verint Systems Inc. offers a number of interception solutions, called StarGate, Vantage and Reliant. Details regarding these products can be found at www.verint.com/communications_interception. The methods and systems described herein can be used with any suitable type of interception system that is capable of obtaining session data from network 28.

Interception system 32 is connected to network 28 using a suitable interface. For example, Net Optics Inc. (Santa Clara, Calif.), produces various passive tapping devices for communication networks, which can be used for this purpose. Information regarding these tapping devices can be found at www.netoptics.com. Alternatively, network elements such as switches and routers in network 28 can be configured to divert or send copies of data packets to interception system 32. Such methods are commonly referred to as port spanning or port mirroring and are well known in the art.

The session data provided by interception system 32 is stored in a session database 36. The session database can also be used for storing any other information, which is produced or used by interception and analysis system 20. Session database 36 may be implemented using any suitable storage device. In some embodiments, database 36 can be embodied in a memory of system 32.

System 20 comprises an identity clustering system 40, which processes the session data provided by interception system 32. As will be described in detail below, clustering system 40 extracts various different communication identifiers from the session data, and groups the identifiers in identity clusters, such that each cluster is attributed to a specific user. System 40 comprises an interface 44, using which system 40 communicates with interception system 32, and a clustering processor 48, which carries out the identifier clustering methods described herein.

Typically, processor 48 comprises a general-purpose computer, which is programmed in software to carry out the functions described herein. The software may be downloaded to the computer in electronic form, over a network, for example, or it may alternatively be supplied to the computer on tangible media, such as CD-ROM. Some of the functions of clustering processor 48 can be performed using hardware elements, such as using Application-Specific Integrated Circuits or hardware accelerators.

The configuration of system 20 shown in FIG. 1 is an exemplary configuration, which is chosen purely for the sake of conceptual clarity. Any other suitable system configuration can also be used. For example, the functions of systems 32 and 40 can be embodied in a single unit, rather than implementing the interception and identifier clustering functions in separate systems. System 40 may have a separate user interface for interacting with an analyst or other operator, or it may alternatively interact with the operator via the user interface of system 32. System 40 may access database 36 directly, or via system 32.

Communication Sessions and Identifiers

Users 24 interact with one another, consume network services and otherwise communicate by conducting communication sessions. In the context of the present patent application and in the claims, the term "session" is used to describe any kind of time-limited network interaction that involves one or more users. Some sessions are explicitly bounded in time and have a well-defined context. Other sessions are defined implicitly. Several examples of explicit and implicit session types are described below.

During a session, the user may use different applications and consume different services. The user identity is defined in a particular session using one or more communication identifiers, depending on the type of network, the type of session and the type of activities carried out by the user. Some identifiers, such as usernames and e-mail addresses, are derived from the application layer of the session and are referred to herein as layer 7 identifiers. Other identifiers are derived from layer 2 or layer 3 of the session and are referred to herein as layer 2/3 identifiers. Layer 2/3 identifiers may comprise, for example, IP addresses and Media Access Control (MAC) addresses. In some cases, telephone numbers can also be regarded as layer 2/3 identifiers, for example when such numbers are used in cellular packet services such as General Packet Radio Service (GPRS) or third generation cellular (3G) packet data. Any suitable representation of a telephone number or of a communication terminal that uses the telephone number can be used as an identifier, such as, for example, International Mobile Subscriber Identity (IMSI), Mobile Station Integrated Services Digital Network (MSISDN), International Mobile Equipment Identity (IMEI) and Temporary Mobile Subscriber Identity (TMSI) values.

Additionally or alternatively, identifiers associated with any other communication layer can also be used.

Some sessions are defined explicitly by a certain communication protocol, have a well-defined session context and are inherently bounded in time by an opening event and a closing event. For example, a session may comprise a user logging in with his or her Internet Service Provider (ISP) using the well-known Remote Authentication Dial-In User Service (RADIUS) authentication protocol. The opening event in this example comprises a RADIUS login message, and a RADIUS logout message serves as the closing event. Throughout this exemplary session, the user is identified by the IP address it uses and by a RADIUS username used for logging in.

Once logged into the ISP network, the user may perform different transactions, use various applications and consume different services. These interactions are collectively referred to herein as sub-sessions. A session comprising multiple sub-sessions is referred to as a composite session. For example, the user may communicate using an instant messaging client, send e-mail messages and/or communicate using a Voice-over-IP (VoIP) phone. Each of these applications uses a different type of identifier for identifying the user. In the instant messaging application, the user is identified using a certain nickname. In the e-mail application, the user is identified by an e-mail address. In the VoIP application, the user is identified by yet another username.

In many cases, although not necessarily, one communication identifier is common to all sub-sessions of a given session, and is referred to herein as the shared identifier of the session. For example, the IP address used by the user is usually the same for all sub-sessions in a given session. Often but not necessarily, the shared identifier is a layer 2 or layer 3 identifier. In many cases, the shared identifier can be extracted from the opening event and used to identify the different sub-sessions during the life span of the session.

Another example of a session that is explicitly time-bounded is a telephony session, which is opened by a call setup message and closed by a call termination message. The telephone number used by the user can serve as the shared identifier. A telephony session may comprise a data sub-session. For example, a cellular telephony session may contain an IP data session, such as using General Packet Radio Service (GPRS). As yet another example, a Dynamic Host Configuration Protocol (DHCP) session is opened by a DHCP login message and closed by a DHCP logout message. The IP address used in these messages can be used as the shared identifier.

In some cases, sessions can be nested within one another in two or more levels of hierarchy. In other words, a sub-session of a certain session may have sub-sessions of its own.

Some sessions are not explicitly time-limited, and are referred to herein as implicit sessions. For example, interception system 32 may monitor the users who browse a particular web-site. In this example, a HyperText Transfer Protocol (HTTP) request sent to the web-site can be used as the opening event, and a time-out defined by the interception system can serve as the closing event of the implicit session. The client IP address can be used as the shared identifier. An implicit session can be opened by detecting any other type of network event that is associated with a certain communication identifier, such as an e-mail message sent from a certain e-mail address.

Other types of sessions may comprise, for example, sessions of peer-to-peer file-sharing applications such as Kazaa, EMule and Gnutella, sessions of peer-to-peer telephony applications such as SKYPE®, and multimedia conferencing applications such as Microsoft® NetMeeting®. In these types of sessions, the user is typically identified by a username or nickname, which can be used as an identifier.

Users 24 may also be identified using other types of communication identifiers, such as, for example, VoIP Session Initiation Protocol Uniform Resource Identifiers (SIP URIs), different types of line identifiers (e.g., Caller Line Identification—CLI), File Transfer Protocol (FTP) usernames, web account names, various path identifiers used in tunneling protocols such as Multi-Protocol Label Switching (MPLS). Further alternatively, any other textual name, address or code that conveys identification information regarding the identity of the user, regarding the affiliation of the user with a certain service or application, regarding the computer used by the user, or regarding the affiliation of the user (or his or her computer) with an organization or other entity, can also be used as an identifier.

Different types of identifiers may be valid for different periods of time. Some identifiers are assigned to a user permanently or for long periods of time, while other identifiers are assigned for short time periods. Processing of identifiers having different validity periods is described further below.

Tracking Network Users using Identify Clusters

As noted above, a particular user 24 identifies using different communication identifiers in different circumstances. When using network 28, a particular user may conduct multiple sessions at different times. The sessions may differ from one another in the applications and services being used. The user may conduct the sessions using different physical computers and may be located at different locations. Consequently, the communication identifiers that identify the user will often differ from one session to another, although some overlap usually exists.

In some applications, it is highly advantageous to associate the different communication identifiers used by a particular user in different sessions, and to be able to relate them to a particular individual. For example, in an intelligence application, an analyst may be interested in tracking the network activity (i.e., the sessions) conducted by a particular target user. Embodiments of the present invention provide methods and systems for tracking the network activity of a target user by grouping ("clustering") the different identifiers used by the user in different communication sessions.

Figure 2:
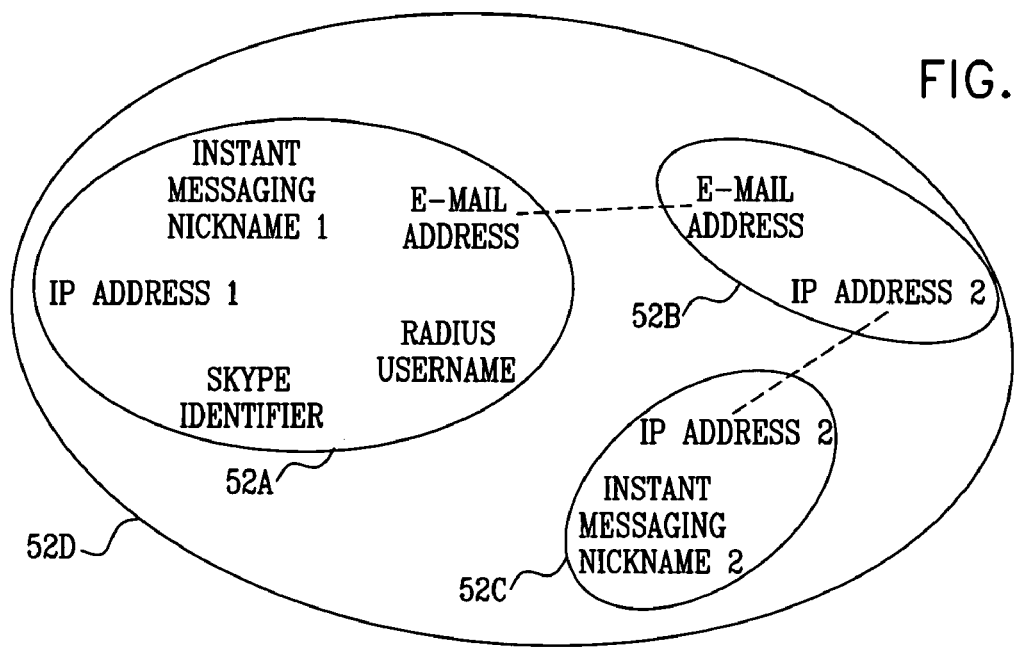
FIG. 2 is a diagram that schematically illustrates identity clusters of a target user, in accordance with an embodiment of the present invention.

FIG. 2 is a diagram that schematically illustrates identity clusters of a target user, in accordance with an embodiment of the present invention. The present example illustrates the concept of identity clustering by considering three sessions, which were conducted by the target user.

In the first session, the target user logs-in using a certain RADIUS username from a computer identified by an IP address denoted "IP ADDRESS 1." During the session, the target user sends an e-mail message from a certain e-mail address and makes a peer-to-peer telephone call using a certain SKYPE® identifier, and sends messages using an instant messaging application, in which he is identified by a nickname denoted "INSTANT MESSAGING NICKNAME 1."

In the second session, the target user communicates from a different computer whose IP address is denoted "IP ADDRESS 2." In the present example, this IP address is assumed to be a fixed allocation. From this computer, the target user sends an e-mail message using the same e-mail address as in the first session. In the third session, the target user uses the same computer as in the second session to communicate using instant messaging. In this session, however, the user uses a nickname denoted "INSTANT MESSAGING NICKNAME 2," which is different from the nickname used in the first session.

FIG. 2 shows three clusters 52A . . . 52C, which are respectively derived from the first, second and third sessions described above. (An exemplary method for identifying sessions and clusters that are associated with a particular user is described in FIG. 3 below.) Each cluster shows the communication identifiers used by the target user during the respective session.

Overall, the target user used seven different identifiers in the three sessions. Although the user used a different set of identifiers in each session, there is some overlap between the identifiers. For example, the same e-mail address was used in the first and second sessions (clusters 52A and 52B), and the same IP address was used in the second and third sessions clusters 52B and 52C). Note that some sessions may have no overlapping identifiers, even though they correspond to the same user. For example, clusters 52A and 52C in FIG. 2 have no overlapping identifiers, and the association between them is established only by cluster 52B.

Using the methods described herein, clustering processor 48 is able to identify the overlapping identifiers and to conclude that all three clusters correspond to the same user. Processor 48 merges clusters 52A . . . 52C into a single merged cluster 52D, which identifies the target user.

As another example, some service providers use the same username when assigning identifiers for different services. Each service, however, can add separate identifiers such as nicknames and aliases. Processor 48 can use the common username to associate the different service-specific identifiers with one another.

In alternative embodiments, clustering processor 48 can construct and merge identity clusters derived from telephony sessions. For example, the user may operate a multi-line communication terminal, such as a fixed or cellular phone having two different telephone numbers. In such cases, terminal attributes such as the IMEI are common to different sessions conducted from the multi-line terminal. Processor 48 can associate the different IMSI or MSISDN values using the common IMEI.

As another example, a user may conduct phone calls from a single handset (same IMEI) and different Subscriber Identity Module (SIM) cards, or use the same SIM card in different handset. In each case, either the equipment attributes (e.g., IMEI) or the user attributes (e.g., IMSI or MSISDN) are common to the different sessions. Processor 48 can use this commonality to associate between different sessions and identifiers.

Identify Clustering Method Description

Figure 3:
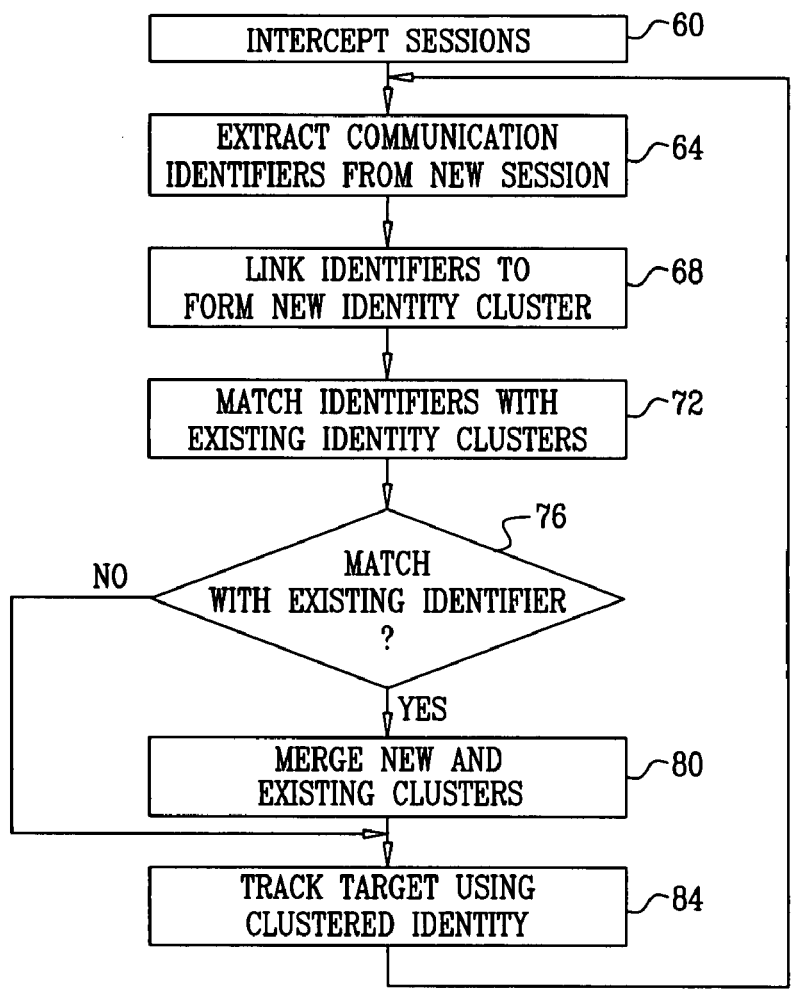

FIG. 3 is a flow chart that schematically illustrates a method for communication analysis using identity clusters, in accordance with an embodiment of the present invention. The method begins with interception system 32 intercepting communication sessions held in network 28, at an interception step 60. System 32 stores the session data in database 36. The sessions may comprise explicit and/or implicit sessions, as described above.

In steps 64-80 below, identity clustering system 40 analyzes the intercepted sessions and identifies each user with an identity cluster, which contains the different identifiers used by the user in the analyzed sessions. Methods for assigning quantitative scores when constructing and merging identity clusters, and methods for processing of identifiers having different validity periods is described further below.

Clustering processor 48 extracts the communication identifiers from a new session, at an identifier extraction step 64. The clustering processor groups the different identifiers extracted from the new session, to form a new identity cluster, at a new cluster forming step 68. The identifiers in the new cluster may comprise layer 2/3 identifiers such as IP addresses, layer 7 identifiers such as e-mail addresses, telephone numbers or usernames, and/or any other identifier type, such as the identifier types described above. When the session comprises sub-sessions, processor 48 may use any suitable method for identifying the different sub-sessions and grouping the identifiers used in the sub-sessions in the newly-formed cluster. For example, when the sub-sessions have a shared identifier, as described above, the shared identifier can be used for identifying the sub-sessions. Processor 48 stores the new cluster in database 36.

Processor 48 now searches the previously-formed clusters in database 36, attempting to match the new cluster with one of the existing clusters, at a matching step 72. Processor 48 searches for overlapping identifiers between the new and existing clusters. In other words, processor 48 searches for an existing cluster, which contains at least one identifier that matches a corresponding identifier in the new cluster.

In some cases, certain identifier types may have finite validity periods. For example, some communication networks allocate, release and reassign IP addresses to different users. In some embodiments, processor 48 tracks the validity periods of some or all identifier types. When an overlapping identifier between two clusters is found, processor 48 declares a successful match only if the validity period of this identifier overlaps in the two clusters. The processing of identifiers having finite validity periods is described in greater detail further below.

If a match is found, as checked by processor 48 at a match checking step 76, the clustering processor concludes that the matching existing cluster and the new cluster correspond to the same user, since they contain an overlapping identifier. Processor 48 then merges the new cluster with the matching existing cluster to form a merged cluster, at a merging step 80. The merged cluster contains the communication identifiers from the two clusters from which it was formed. Processor 48 stores the merged cluster in database 36, replacing the matching cluster found at steps 72 and 76 above. If a match is not found, merging step 80 is skipped.

An operator of system 20 may be involved in the merging process. For example, the operator can manually instruct system 20 to merge a certain pair of clusters. The manual merging can sometimes trigger a sequence of automatic merging operations. Additionally or alternatively, the operator can review and approve/reject some or all of the automatic merging operations performed by the system.

The operator of system 20 can use the merged clusters to perform a variety of tracking-related actions based on the information conveyed in the merged clusters, at a tracking step 84. For example, the operator can track the network activity of a particular target user or other target entity, by considering only sessions and clusters that contain identifiers associated with the target entity. Processor 48 can also analyze some or all of the intercepted sessions, and produce a large collection of identity clusters that identify all intercepted entities.

In some embodiments, system 20 can produce and display a relationship map, showing relationships between different users and entities. A relationship between two entities can be indicated, for example, by a session that involves at least one identifier associated with each of the entities.

In some applications, the operator may be aware of only a subset of the identifiers used by a target user, or only of a single identifier. By using the appropriate identity cluster, the operator can instruct system 20 to query sessions that are conducted by the same user but may be identified by other identifiers in the cluster. This querying process can be applied to past sessions that are stored in database 36, or to future intercepted sessions.

Additionally or alternatively, the geographical location of a target user can sometimes be tracked by tracking the sessions conducted by the user, and in particular the identifiers being used. For example, in a land-line telephone session, the prefix of the user's telephone number can be used as an indication of the geographical location of the user. As another example, cellular communication sessions provide data regarding the specific cell with which the user communicates and/or other location data. This information can be used as an indication of the user geographical location.

Typically, processor 48 repeats the cluster merging process iteratively in order to reach optimal merging, i.e., to reach a situation in which database 36 contains a single identity cluster for each target user. When optimal merging is reached for a set of intercepted sessions, each identity cluster contains the best available information regarding the identifiers used by the respective user.

The merging process can be carried out in real-time or off-line, and at any point in time with respect to the intercepted sessions. For example, processor 48 may perform an iteration of the process of FIG. 3 for each newly-intercepted session. The process can be carried out during the life span of the newly-intercepted session, immediately after the session is concluded, or at a later time. Additionally or alternatively, the cluster merging process can be repeated continuously or periodically over the clusters that are currently stored in database 36, whether or not new clusters are added.

In some cases, a single merging iteration may not be sufficient for ensuring optimal merging. For example, referring to the example of FIG. 2 above, assume that only clusters 52A and 52C are stored in database 36 at a given point in time, and that cluster 52B is added later. Without the presence of cluster 52B, processor 48 has no way of merging clusters 52A and 52C, since they have no overlapping identifiers. When cluster 52B is added to the database, merging clusters 52A, 52B and 52C to form cluster 52D may require two search iterations.

Cross-Domain Clustering between Telephony and Computer Networks

As noted above, communication network 28 may comprise a telephony network or a combination of telephony and IP networks. In some embodiments, identity clustering system 40 performs identity clustering in telephony sessions conducted by users 24. When a particular user conducts telephony sessions and IP sessions, some identifiers may be common to both domains. System 40 can use these identifiers to associate the IP sessions and the telephony sessions and merge the different communication identifiers used in these sessions into the same identity cluster.

For example, assume that a user conducts a voice conversation using a GSM cellular phone, from which system 40 extracts the IMSI, IMEI and MSISDN values. The user then checks his e-mail using a GPRS connection from the same GSM phone. System 40 can associate between the telephony session and the IP session using the attributes of the cellular telephone used in both sessions. Since the telephony-related identifiers are already associated with the IP-related identifiers of the user, when the same user accesses the Internet, checks his e-mail or chats from his home computer, system 40 can associate these sessions with the user, as well.

In another exemplary scenario, a user conducts a VoIP call from his home VoIP telephone set. The user then initiates another VoIP session from his laptop in order to conduct a video chat, via a high-speed cellular 3G modem. Both VoIP sessions use the same VoIP identifier, using which system 40 associates the user's 3G telephone number and identifiers and VoIP identifier (e.g., SIP URI) with one another. Later, the same user sends an e-mail from using the 3G modem, from which system 40 extracts and associates the 3G phone attributes and the user's e-mail address. Eventually, system 40 is able to construct an identity cluster that associates the telephone number and attributes of the user's 3G phone, his VoIP identifier and e-mail address.

In some cases, numbering conventions used by service providers introduce similarities between identifiers in different domains. For example, a user may have a certain stationary telephone number. A VoIP service provider sometimes allocates SIP URIs having the format <stationary phone number>@<service provider>. System 40 can use this convention to associate the identifiers used in telephony sessions conducted from the stationary phone with identifiers used in VoIP sessions that use the corresponding SIP URI.

In some cases, signaling of telephony sessions is transported over an IP network, such as using the well-known Signaling Transport (SIGTRAN) protocol. System 40 can extract both IP-related identifiers and telephony-related identifiers from SIGTRAN messages, and associate the identifiers with one another.

Although the cross-domain embodiments described above mainly addressed joint identity clustering in a computer communication network and a telephony communication network, the methods and systems described above can be used to perform joint identity clustering in communication networks of any other type or domain.

Quantitative Merging Scores

In some embodiments, clustering processor 48 assigns quantitative scores when constructing and merging identity clusters. Scores can be assigned to pairs of identifiers within a cluster, to pairs of clusters being merged, or both. The assigned score is indicative of the confidence level that two clusters or two identifiers indeed correspond to the same user.

Processor 48 may use different criteria for determining the scores. For example, when a cluster is constructed based on an intercepted session, a score can be assigned to the different pairs of identifiers within the session based on the level of uniqueness of the shared identifier of the session. When merging two clusters, a score can be assigned to the cluster pair based on the uniqueness of the overlapping identifier, which was used for matching the two clusters. Additionally or alternatively, the score can be based on the number of overlapping identifiers found in the two clusters. Further alternatively, processor 48 may use any other criteria to quantify the level of confidence in associating pairs of identifiers and/or pairs of clusters, and to assign scores accordingly.

In some embodiments, each identifier within a cluster is assigned a score, which is indicative of the certainty that this identifier indeed belongs to the corresponding user. The score can be presented to an operator as a likelihood or as an error probability, i.e., as the probability that a certain identifier belongs or does not belong to the user in question.

Processor 48 can use the quantitative scores in different ways in the process of constructing and merging identity clusters. For example, in match checking step 76 of the method of FIG. 3 above, processor 48 can merge a pair of clusters only if the score assigned to this cluster pair exceeds a predefined threshold. As another example, processor 48 can assign scores to potential relationships between entities, and regard two entities as having a relationship only when the respective score exceeds a certain threshold.

Scores can also be used for accumulating multiple weak associations and gradually building-up the confidence that a particular pair of identifiers or clusters indeed correspond to the same user. For example, a pair of clusters may initially be linked by an association having a relatively low score, such as by an IP address whose validity is questionable. If processor 48 identifies additional associations between the two clusters at a later time, the confidence that the clusters are associated with the same user is increased and the clusters can be merged. Note that the score of each separate association between the clusters may be low, but the cumulative score, aggregated over the different associations, can be sufficiently high to justify merging the clusters.

Scores can play a particularly important role when processing implicit sessions, in which the validity of identifiers is often determined heuristically and is less well-defined in comparison with explicit sessions.

In some embodiments, processor 48 varies the score that quantifies the association between certain identifiers or clusters over time. For example, the score can be reduced if no current information that supports or strengthens the association is received. When new supporting information arrives, the score can be increased.

Identifiers having Finite Validity Periods

Different types of communication identifiers may be valid for different periods of time. Some identifiers, such as e-mail addresses and telephone numbers, are assigned to a user permanently, or at least for a long period of time. Even when such an identifier is released, it is unlikely to be reassigned to a different user. Other identifiers are assigned for short time periods. For example, in many communication networks and applications, IP addresses are assigned dynamically, on an ad-hoc basis.

Failing to consider the different validity periods of different identifiers may sometimes lead to improper and erroneous identifier matching and clustering. For example, when IP addresses are assigned, released and reassigned on a regular basis, two clusters having an overlapping IP address may sometimes correspond to different users, especially if there is a large time difference between the two sessions.

In some embodiments of the present invention, clustering processor 48 takes into account the different validity periods of different identifier types when matching and merging identity clusters. Typically but not necessarily, layer 7 identifiers, such as usernames, e-mail addresses and telephone numbers, are considered to have long validity periods. Layer 2 identifiers such as IP addresses are considered to have short validity periods, particularly when they are assigned and released dynamically.

FIG. 4 is a flow chart that schematically illustrates a method for associating layer 7 identifiers using dynamically-assigned layer 2 identifiers, in accordance with an embodiment of the present invention. Although the method of FIG. 4 addresses the association of layer 7 identifiers using dynamically-assigned layer 2 identifiers, the method can be used to associate other types of long-validity identifiers using other types of short-validity identifiers.

The terms "long-lived identifier" and "identifier having a long validity period" are used herein to describe identifiers that are likely to remain constant over the total time period over which the intercepted sessions are analyzed. The terms "short-lived identifier" and "identifier having a short validity period" are used to describe identifiers whose validity periods are shorter than the total period over which the intercepted sessions are analyzed. Identifiers having short validity periods are likely to become invalid or take different values over the total interception period.

Some layer 3 identifiers, such as Temporary Mobile Subscriber Identity (TMSI) values used in cellular networks and Virtual Path Identifiers (VPI) and Virtual Circuit Identifiers (VCI) used in ATM networks can also be considered to be short validity identifiers in this context.

The method begins with interception system 32 intercepting communication sessions from network 28 and storing the session data in database 36, at a session interception step 90. Clustering processor 48 extracts the IP addresses from the sessions, at an address extraction step 94.

In many cases, communication originating from clients provides better association between identifiers in comparison with communication originating from servers. In other words, when a certain session is held between a service provider and a service consumer, the information intercepted from the service consumer has a higher likelihood of providing better correlation between identifiers. In many cases, for example, the mere fact that two IP addresses have requested a service from the same server does not necessarily indicate a relation between them. Therefore, in some embodiments, processor 48 assigns the information gathered from communication generated by clients (service consumers) a higher confidence level in comparison with the confidence level assigned to information gathered from servers (service providers). In some cases, processor 48 uses only the information generated by clients for cluster construction and merging.

Processor 48 classifies the extracted IP addresses into clients and servers, at a classification step 98. The classification is typically based on the network activity of the computer that uses each IP address. In other words, processor 48 attempts to determine whether each IP address represents a computer that provides a service or consumes a service.

Processor 48 may use various criteria for determining whether a certain IP address represents a client or a server. For example, processor 48 may track the allocation and releasing of IP addresses by intercepting protocols such as DHCP and RADIUS. Processor 48 may also analyze the pattern and content of the intercepted sessions. For example, computers that participate in large volumes of transactions and/or computers that generate large numbers of response messages are likely to be servers. The classification process may also take into account prior knowledge regarding the layout and structure of network 28.

In some embodiments, processor 48 considers only the client sessions in the cluster construction and merging process, and discards the server sessions. In alternative embodiments, processor 48 assigns a high confidence score to the client IP addresses, and a significantly lower score to the server IP addresses. (Note that a particular IP address can represent a server of one service and a client of another service.)

Within each intercepted session, processor 48 associates the layer 7 identifiers with dynamically-assigned layer 2 identifiers, at an intra-session association step 102. Processor 48 determines the validity period (also sometimes referred to as Time To Live—TTL) of the associations performed at step 102 above. In some cases, the validity period of the association is determined by an explicit network event. For example, in RADIUS IP allocation the IP address is released by the RADIUS logout message, therefore the association is valid only prior to this message. In other cases, the validity period may be estimated based on different heuristics, predetermined time-out periods or any other criteria.

Processor 48 uses the currently-valid layer 2 identifiers to associate between different layer 7 identifiers outside the context of a single session, at an inter-session association step 110. When processor 36 identifies two sessions, which have an overlapping layer 2 identifier and which took place during the same validity period of this identifier, it can assume that the two sessions are associated with the same user. In other words, the association between the layer 2 and layer 7 identifier, which was determined at step 102 above, should have an overlapping validity period in both sessions.

For example, assume that a certain layer 2 identifier is known to have a validity period of one hour. If processor 48 finds two sessions, which comprise this layer 2 identifier and which took place within one hour, the two sessions will be considered to correspond to the same user. Consequently, different layer 7 identifiers in the two sessions will be considered to represent the same user. When a match is found, processor 48 associates the layer 7 identifiers from the two sessions and regards them as corresponding to the same user.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computer-implemented method for communication analysis, comprising:

monitoring communication sessions, which are conducted by entities in a communication network;

extracting from the monitored sessions identifiers that identify the entities;

grouping the identifiers extracted from the sessions in respective identity clusters, each identity cluster identifying a respective entity;

merging a subset of the identity clusters, which comprise identifiers that identify a target entity, to form a merged identity cluster that identifies the target entity, wherein merging the subset of the identity clusters comprises identifying in the identity clusters first and second identity clusters comprising a common identifier having a first validity period in the first identity cluster and a second validity period in the second identity cluster, and merging the first and second identity clusters responsively to verifying that the first validity period overlaps the second validity period; and tracking an activity of the target entity in the communication network using the merged identity cluster, wherein the common identifier comprises a short-lived identifier having a short validity period, wherein the first identity cluster comprises a first long-lived identifier, wherein the second identity cluster comprises a second long-lived identifier different from the first long-lived identifier, and wherein verifying that the first validity period overlaps the second validity period comprises associating the first and second long-lived identifiers with the target entity based on the common short-lived identifier.

2. The method according to claim 1, wherein the entities comprise individual users of the communication network.

3. The method according to claim 1, wherein the identifiers comprise at least one identifier type selected from a group of types consisting of an Internet Protocol (IP) addresses, a Media Access Control (MAC) address, a Uniform Resource Identifier (URI), a path identifier in a tunneling protocol, a line identifier, a username, an e-mail addresses, a chat nickname, a nickname of an instant messaging application, a username of a peer-to-peer application, a username of a conferencing application, an International Mobile Subscriber Identity (IMSI), a Mobile Station Integrated Services Digital Network (MSISDN), an International Mobile Equipment Identity (IMEI), a Temporary Mobile Subscriber Identity (TMSI), a Voice over Internet Protocol (VoIP) identifier and a telephone number.

4. The method according to claim 1, wherein merging the subset of the identity clusters comprises iteratively searching the identity clusters in order to identify the identity clusters that identify the target entity, and progressively merging the identified identity clusters with one another.

5. The method according to claim 1, wherein at least one of the communication sessions comprises a composite session, which comprises multiple sub-sessions having a shared identifier that is common to all the sub-sessions, and wherein extracting and grouping the identifiers comprise identifying the sub-sessions of the composite session using the shared identifier, extracting the identifiers from the identified sub-sessions and grouping the identifiers extracted from the sub-sessions in a respective identity cluster.

6. The method according to claim 1, wherein grouping the identifiers comprises estimating likelihoods that the identifiers grouped in each identity cluster identify the respective entity, and assigning respective scores based on the likelihoods to the grouped identifiers in the identity cluster.

7. The method according to claim 1, wherein merging the subset of the identity clusters comprises estimating likelihoods that the merged identity clusters in the subset identify the target entity and assigning respective scores based on the likelihoods to the merged identity clusters.

8. The method according to claim 1, wherein at least some of the sessions are conducted between service consumers and respective service providers, and wherein extracting the identifiers comprises identifying the service consumers and the service providers, assigning the identifiers that identify the service consumers a first confidence level and assigning the identifiers that identify the service providers a second confidence level lower than the first confidence level.

9. The method according to claim 8, wherein assigning the first and second confidence levels comprises refraining from using the identifiers that identify the service providers.

10. The method according to claim 1, wherein tracking the activity comprises tracking a geographical location of the target entity.

11. The method according to claim 1, wherein merging the identity clusters comprises constructing multiple identity clusters corresponding to respective entities, and wherein tracking the activity comprises determining and presenting one or more relationships between the entities.

12. The method according to claim 1, wherein the communication network comprises first and second communication networks of respective different first and second communication domains, wherein monitoring the communication sessions comprises monitoring a first communication session conducted by the target entity in the first communication network and a second communication session conducted by the target entity in the second communication network, and wherein merging the subset of the identity clusters comprises merging first and second identity clusters derived respectively from the first and second communication sessions into the merged identity cluster.

13. The method according to claim 12, wherein the first communication network comprises a computer communication network and wherein the second communication network comprises a telephony network.

14. Apparatus for communication analysis, comprising:
an interface, which is arranged to accept data of communication sessions conducted by entities in a communication network; and
a processor, which is arranged to extract from the data identifiers that identify the entities, to group the identifiers in identity clusters, each identity cluster identifying a respective entity, to merge a subset of the identity clusters, which comprise identifiers that identify a target entity, to form a merged identity cluster that identifies the target entity, wherein the processor is arranged to identify in the identity clusters first and second identity clusters comprising a common identifier having a first validity period in the first identity cluster and a second validity period in the second identity cluster, and wherein the processor is arranged to form the merged identity cluster by merging the first and second identity clusters responsively to verifying that the first validity period overlaps the second validity period, and to track an activity of the target entity in the communication network using the merged identity cluster,
wherein the common identifier comprises a short-lived identifier having a short validity period, wherein the first identity cluster comprises a first long-lived identifier, wherein the second identity cluster comprises a second long-lived identifier different from the first long-lived identifier, and wherein verifying that the first validity period overlaps the second validity period comprises associating the first and second long-lived identifiers with the target entity based on the common short-lived identifier.

15. The apparatus according to claim 14, wherein the entities comprise individual users of the communication network.

16. The apparatus according to claim 14, wherein the identifiers comprise at least one identifier type selected from a group of types consisting of an Internet Protocol (IP) addresses, a Media Access Control (MAC) address, a Uniform Resource Identifier (URI), a path identifier in a tunneling protocol, a line identifier, a username, an e-mail addresses, a chat nickname, a nickname of an instant messaging application, a username of a peer-to-peer application, a username of a conferencing application, an International Mobile Subscriber Identity (IMSI), a Mobile Station Integrated Services Digital Network (MSISDN), an International Mobile Equipment Identity (IMEI), a Temporary Mobile Subscriber Identity (TMSI), a Voice over Internet Protocol (VoIP) identifier and a telephone number.

17. The apparatus according to claim 14, wherein the processor is arranged to iteratively search the identity clusters in order to identify the identity clusters that identify the target entity, and to progressively merge the identified identity clusters with one another.

18. The apparatus according to claim 14, wherein at least one of the communication sessions comprises a composite session, which comprises multiple sub-sessions having a shared identifier that is common to all the sub-sessions, and wherein the processor is arranged to identify the sub-sessions of the composite session using the shared identifier, to extract the identifiers from the identified sub-sessions and to group the identifiers extracted from the sub-sessions in a respective identity cluster.

19. The apparatus according to claim 14, wherein the processor is arranged to estimate likelihoods that the identifiers grouped in each identity cluster identify the respective entity, and to assign respective scores based on the likelihoods to the grouped identifiers in the identity cluster.

20. The apparatus according to claim 14, wherein the processor is arranged to estimate likelihoods that the merged identity clusters in the subset identify the target entity, and to assign respective scores based on the likelihoods to the merged identity clusters.

21. The apparatus according to claim 14, wherein at least some of the sessions are conducted between service consumers and respective service providers, and wherein the processor is arranged to identify the service consumers and the service providers, to assign the identifiers that identify the service consumers a first confidence level and to assign the identifiers that identify the service providers a second confidence level lower than the first confidence level.

22. The apparatus according to claim 21, wherein the processor is arranged to refrain from using the identifiers that identify the service providers.

23. The apparatus according to claim 14, wherein the processor is arranged to track a geographical location of the target entity using the merged identity cluster.

24. The apparatus according to claim 14, wherein the processor is arranged to construct multiple identity clusters corresponding to respective entities, and to determine and present one or more relationships between the entities using the identity clusters.

25. The apparatus according to claim 14, wherein the communication network comprises first and second communication networks of respective different first and second communication domains, wherein the interface is arranged to accept the data of respective first and second communication sessions conducted by the target entity in the first and communication networks, and wherein the processor is arranged to merge first and second identity clusters, which are derived respectively from the first and second communication sessions, into the merged identity cluster.

26. The apparatus according to claim 25, wherein the first communication network comprises a computer communication network and wherein the second communication network comprises a telephony network.

27. A computer software product for communication analysis, the product comprising a non-transitory computer-readable medium, in which program instructions are stored, which instructions, when read by a computer, cause the computer to accept data of communication sessions conducted by entities in a communication network, to extract from the data identifiers that identify the entities, to group the identifiers in identity clusters, each identity cluster identifying a respective entity, to merge a subset of the identity clusters, which comprise identifiers that identify a target entity, to form a merged identity cluster that identifies the target entity, wherein to merge the subset of the identity clusters, the instructions cause the computer to identify in the identity clusters first and second identity clusters comprising a common identifier having a first validity period in the first identity cluster and a second validity period in the second identity cluster, and merge the first and second identity clusters responsively to verifying that the first validity period overlaps the second validity period, and to track an activity of the target entity in the communication network using the merged identity cluster, wherein the common identifier comprises a short-lived identifier having a short validity period, wherein the first identity cluster comprises a first long-lived identifier, wherein the second identity cluster comprises a second long-lived identifier different from the first long-lived identifier, and wherein verifying that the first validity period overlaps the second validity period comprises associating the first and second long-lived identifiers with the target entity based on the common short-lived identifier.

* * * * *